July 20, 1948.    T. D. TYRA    2,445,343
CONTROL SYSTEM FOR AIRPLANES
Filed April 16, 1943
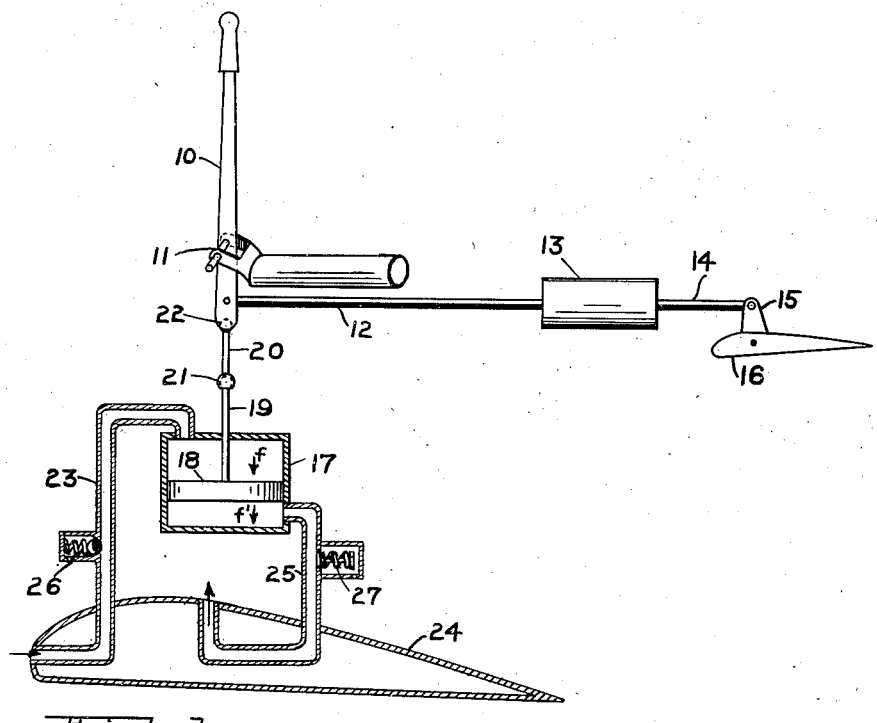
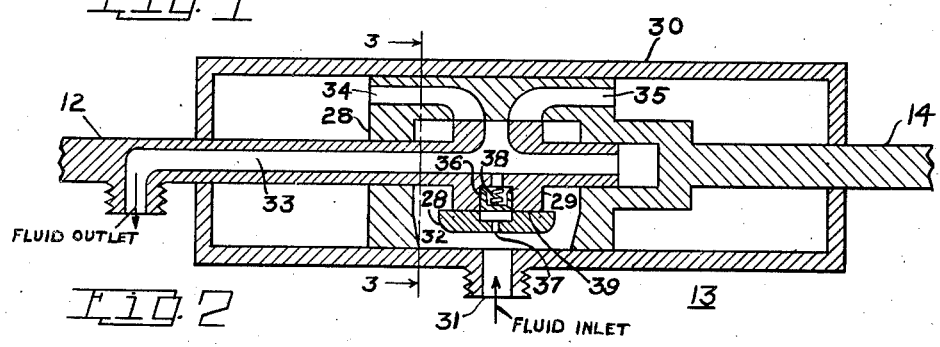
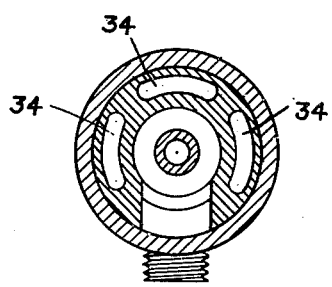
INVENTOR
THOMAS D. TYRA
BY
ATTORNEY Patented July 20, 1948

2,445,343

UNITED STATES PATENT OFFICE 2,445,343

CONTROL SYSTEM FOR AIRPLANES

Thomas D. Tyra, United States Navy

Application April 16, 1943, Serial No. 483,245

8 Claims. (Cl. 244—78)

(Granted under the act of March 3, 1883, as amended April 30, 1928; 370 O. G. 757)

This invention relates to aircraft and more particularly to operation of the control surfaces thereof.

In aircraft of current design, the external forces which act upon the various control surfaces are often so great as to make it practically impossible for the pilot to move the control surfaces directly and hence it is quite common to interpose a servomotor system or booster of some suitable type between the control lever or "stick" as it is sometimes called and the control surface in order to reduce the forces which must be applied by the pilot in effecting the desired movement of the control surface.

However, the "feel" or reaction force which is naturally present in an aircraft control system utilizing mechanical linkage between the control surface and control stick is lost when a servomotor or booster system is interposed between the control stick and the control surface. In order to artificially create the desirable "feel," it is quite common to feed back a portion of the external forces acting upon the control surfaces through the servomotor or booster system to the control stick.

It may be said that "feel" in an airplane control system is that quality or characteristic whereby from the response of the control to the pilot's touch, the pilot is provided with information essential not only for safe flight but also for the maximum effectiveness of the airplane. Thus a control system with good "feel" will keep the pilot advised of the speed of the airplane, or of changes in speed. It will, in a general way indicate the attitude of the airplane and will also warn of any impending stall. When the control surfaces are deflected the pilot will know how much they have been moved, and whether the loads on them and on the remaining structure of the airplane are within safe limits. Feel itself is largely dependent upon the variation in stick force with deflection, airspeed and angle of attack.

A common defect in some systems of control known at the present time is that while a satisfactory amount of "feel" is transmitted to the control stick at moderate speeds of the airplane either an excessive amount of "feel" may be present at high speeds or, at low speeds only a negligible amount of "feel" may be given to the pilot.

For a strong, highly maneuverable airplane, such as a fighter, the amount of "feel" should normally be kept quite light. In an airplane of this type, the ailerons, for instance, may have sufficient strength to be fully deflected at a speed of three or four hundred miles per hour. The control force should be so adjusted that the control can be fully deflected at the limiting speed without undue exertion of the pilot, and thus in this case, a force of twenty pounds applied to the control stick by the pilot might correspond to full deflection of the control surface at three hundred miles per hour. For the elevators, a force of perhaps eight or ten pounds for the deflection necessary to produce a 1 g acceleration might be desirable.

On the other hand, for a less strong, less maneuverable airplane, such as a transport, the control forces opposing movement of the controls by the pilot should be appreciably heavy. Thus for a plane of this type and depending upon its actual strength, the control apparatus might be so designed that a force of twenty pounds exerted by the pilot might correspond to full deflection of an aileron at perhaps only one hundred miles per hour; and for the elevators, a control force of perhaps fifteen to twenty pounds per "g" of acceleration might be desirable.

It is thus a general object of my invention to provide an improved control system in which novel means are utilized for producing a correct amount of "feel" or opposing force to the control stick for all flight conditions and one that may be easily modified to vary its operative characteristics as may be required to fit control requirements for different types of aircraft.

A more specific object of my invention is to provide an improved aircraft control system in which a servomotor units is interposed between a manually operated control member and a control surface to obtain a desired deflection of the control surface without imposing any appreciable reactive force or "feel" on the control stick, and then by entirely independent means to introduce the desired "feel" to the control stick and hence to the pilot's hand.

Another object of my invention is to provide a control system for aircraft in which a servomotor system is normally interconnected between the pilot operated control member and a control surface of the aircraft to assist the pilot in moving the control surface but which includes means for providing an automatic transfer over to direct manual operation of the control surface by the pilot in the event of failure of the servomotor system to function.

A further object is to provide an improved apparatus for introducing "feel" to the manually operated control stick, the amount of which varies as a function of the dynamic or positive pressure acting upon the aircraft while in flight.

Still another object is to provide an improved apparatus for introducing "feel" to the pilot operated control stick in which the amount of the "feel" varies as a function of the negative pressure or "lift" which may exist over a surface of the aircraft.

A still further object is to provide apparatus for introducing "feel" to the pilot in which the amount of such "feel" is determined by both the dynamic or positive pressure acting upon the aircraft and the negative pressure acting upon a surface thereof. Another object of the invention is to provide a novel servomotor construction.

These and other objects of my invention will become more apparent from the following specification and drawings which illustrate a preferred embodiment of the invention. It is to be expressly understood, however, that the embodiment shown in the drawings is for illustration purposes only and that modifications therein may be made by those skilled in the art without departing from the spirit and the scope of my invention as defined in the appended claims.

In the drawings:

Fig. 1 is a diagrammatic view illustrating the invention;

Fig. 2 is a longitudinal section through a suitable servomotor device which may be utilized in the invention; and Fig. 3 is a vertical section taken on lines 3—3 of Fig. 2.

Referring now to the drawings a control member such as the stick 10, which is adapted to be operated manually by the pilot for deflecting various control surfaces of the aircraft, is pivotally mounted at 11. A shaft 12 is pivotally connected at one end thereof to the control stick 10 and the other end is connected with a servomotor 13 to control the operation thereof. Another shaft 14 which is operated by the servomotor 13 is connected to a horn 15 of a control surface 16 of the aircraft.

As will be explained in detail hereinafter, motion of the control stick 10 fore and aft functions to control operation of the servomotor 13 to transmit appropriate deflections to the control surface 16.

It should be noted here that no appreciable force is required to be exerted by the pilot in moving the stick 10 in controlling the operation of the servomotor 13.

In order to introduce an appropriate amount of force or "feel" opposing motion of the control stick 10, my invention contemplates the use of the dynamic or positive pressure acting upon the aircraft and also of the negative pressure or "lift" which may exist over a surface of the aircraft. A preferred apparatus for effecting this desired result consists of a cylinder 17 which contains a piston 18 and piston rod 19. The latter is connected for operation from the control stick 10 by means of a link 20 and ball and socket joints 21, 22.

For introducing the element of dynamic or positive pressure, a conduit 23 may be connected between the top of cylinder 17 and the leading edge of an airfoil 24 of the aircraft and this creates a force "f" acting downwardly on piston 18. Thus by leading full dynamic pressure to the top of piston 18, the stick force or "feel" as measured at the control grip of control lever 10 will increase with both the deflection of the lever 10 and the velocity of the aircraft. If the movement of the control surface 16 corresponds to that of the lever 10, then, at a given deflection, the load on the control surface will be approximately proportional to the velocity of the aircraft and the force on the control lever 10 will correspond very closely with the actual load on the control surface.

To augment the force resulting from the dynamic pressure, a conduit 25 may lead from the bottom of cylinder 17 to a portion of the airfoil 24 where reasonably high velocities normally occur. The function of this arrangement is threefold. First, because of the negative pressure which normally exists at such a point on the airfoil, a force "f'" is created on the bottom of the piston 18 which supplements the force "f" acting downwardly on the top of piston 18 due to the dynamic pressure. Secondly, at a given velocity of the aircraft, as the angle of attack of the airfoil 24 increases, the negative pressure over this portion of the airfoil 24 will also increase. This increase in negative pressure increases the force "f'" opposing movement of the piston 18 and hence the load on the control lever 10 will, therefore, tend to increase with increases in angle of attack of the airfoil 24. Thirdly, by positioning the outlet of conduit 25 at that portion of the airfoil 24 over which the air flow first breaks down when stalling is about to occur, then, as a stall is approached, the suction on the underside of piston 18 will be decreased. This will result in the stick forces being decidedly reduced. The control stick 10 will feel "mushy," thereby giving an indication that a stall is approaching. It should be noted that this reduction in forces acting on the control lever 10 as a stall is approached is a natural characteristic of well designed, normal control systems.

It may be desirable to introduce a spring loaded valve means 26 in the conduit 23 and similar valve means 27 in conduit 25 in order to limit the amount of force acting upon the piston 18 in cylinder 17.

From the foregoing it will be evident that the total amount of force acting upon the piston 18 which opposes movement thereof as the pilot moves the control lever 10 will vary as the sum of the forces "f" and "f'" created by the dynamic and negative pressures. This is a very desirable effect in that the amount of opposing force will vary in accordance with changes in speed of the aircraft and also with changes in angle of attack of the aircraft airfoils.

The servomotor device 13 shown in Figs. 2 and 3 consists essentially of a power piston 28 and a control valve 29 which are slidable in a cylinder 30. Control valve 29 may be formed at the end of the shaft 12. Piston 28 which is the power piston of the servomotor 13 is formed at one end of shaft 14, the opposite end of the latter being pivotally connected to the horn 15 on control surface 16. A fluid inlet 31 connects with a chambered portion 32 within the piston 28 and a fluid outlet at low pressure is provided by a tubular portion 33 which is formed within the valve 29 and end portion of shaft 12. Piston 28 is provided with a plurality of ports 34 through which fluid is ported between the chamber 32 into one end of the cylinder 30 and ports 35 through which fluid is ported between chamber 32 and the other end of cylinder 30.

The servomotor 13 works in the following manner. Let it be assumed that the control valve 29 is displaced slightly to the right by a movement forward of the control stick 10. This will connect the fluid under pressure in chamber 32 with the port 34 leading to the interior of cylinder 30 on the left side of piston 28 and at the same time the portion of the cylinder 30 on the right side of piston 28 will be connected through ports 35 to the tubular portion 33 of valve 29. The resulting differences in pressure on piston 28 will cause it to also move to the right until it catches up with valve 29, at which time all ports will be closed and no further movement of the piston 28 will take place. Movement of valve 29 to the left will effect in a similar manner a corresponding movement of piston 28 to the left.

It will be evident that the only force required to move valve 29 is the slight amount necessary to overcome friction. Thus with perhaps one or two pounds force exerted on valve 29 through the shaft 12, a thousand pounds or more can be developed on the shaft 14. This servomotor arrangement brings about several important results. First, the stick forces at the pilots grip on the control stick 10 which have previously been adjusted to obtain the optimum amount of "feel" and controllability will not be upset by any disturbing forces from the control surfaces. Secondly, even though the hinge moments of the control surface may become excessively high for certain conditions of flight, the pilot will still be able to deflect the surface so as to control the airplane without too much effort. Thirdly, during such time as the valve 29 is not in motion, the control surface will be located rigidly in position which should materially reduce the possibility of flutter.

As an emergency measure, a spring loaded plug 36 is provided in the structure of valve 29. When fluid in chamber 32 is at normal operating pressure, such pressure is exerted on the bottom face of plug 36 via port 37 holding plug 36 in an upward position against the restoring force of spring 38 so that the bottom face of plug 36 is at least co-planar with the surface 39 of piston 28. In this manner, under normal fluid pressure conditions, valve 29 moves freely with respect to piston 28. In the event that fluid pressure in the chamber 32 should fail, the plug 36 will be forced outwardly locking valve 29 and piston 28 together. The effect then of failure of fluid pressure would be to lock shafts 12 and 14 together, thus connecting the control surface 16 directly to the control stick 10 and providing for direct manual operation of the control surface 16 by the pilot.

As an alternative structure, in lieu of the single piston and cylinder arrangement above described, one might utilize one piston and cylinder for deriving the force which is variable with dynamic or positive pressure and a separate piston and cylinder for deriving the force variable with negative pressure, suitable linkage means being provided for connecting each of the pistons to the control lever.

Still a further embodiment might utilize a bellows having a diaphragm centrally located therein and a yoke member secured to a medial portion of the bellows for linkage to the control stick. Such an arrangement would include means for admitting dynamic pressure to the interior of the bellows on one side of the diaphragm and negative pressure to the interior of the bellows on the other side of the diaphragm.

The invention described herein may be manufactured and used by or for the Government of the United States of America for governmental purposes without the payment of any royalties thereon or therefor.

Having thus fully described my invention, I claim:

1. In an aircraft including a control surface therefor and a control member adapted to be moved from a neutral position by the pilot for deflecting said control surface, a piston, pneumatic means for transmitting a force proportional to the negative pressure which exists over a surface of said aircraft to said piston, and means for operatively connecting said piston to said control member to bias it to its neutral position.

2. In an aircraft including a control surface therefor and a control member adapted to be moved from a neutral position by the pilot for deflecting said control surface, a piston, means for transmitting a force proportional to the speed of said aircraft to one side of said piston, means for transmitting a force proportional to the negative pressure which exists over a surface of said aircraft to the other side of said piston, and means for operatively connecting said piston to said control member to bias it to its neutral position.

3. In an aircraft including a control surface therefor and a control member adapted to be moved from a neutral position by the pilot for deflecting said control surface, force transmitting means responsive to the negative pressure which exists over a surface of said aircraft, and means for operatively connecting said force transmitting means to said control member to bias it to its neutral position.

4. In an aircraft including a control surface therefor and a control member adapted to be moved from a neutral position by the pilot for deflecting said control surface, force transmitting means cumulatively responsive to dynamic pressure and to the negative pressure which exists over the surface of said aircraft, and means for operatively connecting said force transmitting means to said control member to bias it to its neutral position.

5. In an aircraft including a control surface and a control member adapted to be moved from a neutral position by the pilot for deflecting said control surface, a cylinder including a piston, means connecting said control member to said piston, and means for admitting dynamic pressure into said cylinder on one side of said piston to thereby create a force opposing movement by the pilot of said piston and the control member connected thereto in a direction away from said neutral position.

6. In an aircraft including a control surface and a control member adapted to be moved from a neutral position by the pilot for deflecting said control surface, a cylinder including a piston, means connecting said control member to said piston, and means for admitting negative pressure which exists over a surface of said aircraft into said cylinder on one side of said piston to thereby create a force opposing movement of said piston and the control member connected thereto in a direction away from said neutral position.

7. In an aircraft including a control surface and a control member adapted to be moved from a neutral position by the pilot for deflecting said control surface, a cylinder including a piston, means connecting said control member to said piston, means for admitting dynamic pressure into said cylinder on one side of said piston to thereby create a force, and means for admitting negative pressure which exists over a surface of said aircraft into said cylinder on the other side of said piston to thereby create a second force whereby the total force opposing movement of said piston and said control member away from said neutral position will be equal to the sum of the forces created by said dynamic and negative pressures.

8. In an aircraft control system including a control surface and a manually operated control member movable from a neutral position to deflect said control surface, the combination comprising, a servo-motor unit interposed between said control member and said control surface for obtaining a desired deflection of said control surface without imposing any appreciable reactive force on said control member, and pneumatic piston means operable independently of the reactive forces at the control surface, and operatively connected to said control member for introducing a desired feel to said control member to bias it to its said neutral position, said piston means being responsive cumulatively to dynamic pressure and negative pressure existing over a surface of said aircraft.

THOMAS D. TYRA.

REFERENCES CITED

The following references are of record in the file of this patent:

UNITED STATES PATENTS

| Number | Name | Date |
|---|---|---|
| 1,351,538 | Reynolds | Aug. 31, 1920 |
| 1,365,347 | Schneider | Jan. 11, 1921 |
| 1,710,399 | Banning | Apr. 23, 1929 |
| 1,896,999 | Bertran | Feb. 7, 1933 |
| 1,959,177 | Sassen | May 15, 1934 |
| 2,139,965 | Ljungstrom | Dec. 13, 1938 |
| 2,140,037 | Swisher | Dec. 13, 1938 |
| 2,176,807 | Wunsch | Oct. 17, 1939 |
| 2,227,375 | Carlson | Dec. 31, 1940 |
| 2,295,159 | Child | Sept. 8, 1942 |
| 2,297,412 | Hoppe | Sept. 29, 1942 |

FOREIGN PATENTS

| Number | Country | Date |
|---|---|---|
| 321,851 | Great Britain | Dec. 3, 1928 |
| 803,196 | France | June 29, 1936 |